US009845162B2

(12) United States Patent
Campbell, Jr.

(10) Patent No.: US 9,845,162 B2
(45) Date of Patent: Dec. 19, 2017

(54) PROTECTIVE FINISH FOR WING TIP DEVICES

(71) Applicant: THE BOEING COMPANY, Chicago, IL (US)

(72) Inventor: Darrell D. Campbell, Jr., Vashon Island, WA (US)

(73) Assignee: THE BOEING COMPANY, Chicago, IL (US)

( * ) Notice: Subject to any disclaimer, the term of this patent is extended or adjusted under 35 U.S.C. 154(b) by 327 days.

(21) Appl. No.: 13/887,211

(22) Filed: May 3, 2013

(65) Prior Publication Data

US 2014/0328694 A1 Nov. 6, 2014

(51) Int. Cl.
*B64D 45/00* (2006.01)
*B64C 3/00* (2006.01)
*B64C 23/06* (2006.01)

(52) U.S. Cl.
CPC .............. *B64D 45/00* (2013.01); *B64C 3/00* (2013.01); *B64C 23/065* (2013.01); *B64D 2045/009* (2013.01); *Y02T 50/164* (2013.01); *Y10T 156/10* (2015.01)

(58) Field of Classification Search
CPC .................. B64D 2045/009; B64C 23/065
See application file for complete search history.

(56) References Cited

U.S. PATENT DOCUMENTS 3,616,140 A * 10/1971 Copeland et al. ........... 428/35.7
4,594,761 A *  6/1986 Murphy et al. ............ 29/889.71
4,966,527 A * 10/1990 Merz .......................... 416/241 R
4,990,205 A *  2/1991 Barbier et al. ............... 156/242
5,486,096 A *  1/1996 Hertel et al. ................. 416/224
6,516,652 B1* 2/2003 May ............................ B63B 1/34
                                                                    73/10
2002/0036228 A1* 3/2002 Reese ........................ B65D 3/22
                                                                    229/4.5

(Continued)

FOREIGN PATENT DOCUMENTS

EP     2348192 A2    7/2011
GB      662110 A    11/1951
(Continued)

OTHER PUBLICATIONS

"Excellent Erosion Protection." 3M Aerospace. 2008. pp. 1-6.*
(Continued)

*Primary Examiner* — Philip J Bonzell
*Assistant Examiner* — Michael Kreiner
(74) *Attorney, Agent, or Firm* — Yee & Associates, P.C.

(57) ABSTRACT

The present disclosure provides a system, method, and apparatus for a protective finish for an airfoil. In one or more embodiments, the disclosed method involves providing a sheath, and applying the sheath to the surface of the airfoil. In one or more embodiments, the sheath wraps around the surface of the airfoil from the leading edge of the airfoil towards the trailing edge of the airfoil. In at least one embodiment, the sheath covers approximately 50 percent to approximately 70 percent of the chord length of the airfoil. In some embodiments, the sheath is manufactured from at least one polymer, such as a polyurethane and/or a floropolymer. In one or more embodiments, the airfoil is a winglet, a raked wing tip, and/or a wing.

11 Claims, 3 Drawing Sheets

(56) References Cited

U.S. PATENT DOCUMENTS

| | | | | |
|---|---|---|---|---|
| 2011/0001016 A1* | 1/2011 | Skillen | ............... | B64C 3/40 244/218 |
| 2011/0006165 A1* | 1/2011 | Ireland | ............... | 244/200.1 |

FOREIGN PATENT DOCUMENTS

| | | |
|---|---|---|
| GB | 2461133 A | 12/2009 |
| GB | 2490425 A | 10/2012 |

OTHER PUBLICATIONS

3M Polyurethane Protective Tape 8663HS (high shear adhesive) Technical Datasheet. Apr. 2010.*
3M Polyurethane Protective Boots (Technical Bulletin). Oct. 2007.*
3M Polyurethane Protective Tape Painting Instructions (Technical Bulletin). Feb. 2011.*
CRJ 700/900 Series Regional Jet: Technical Familiarization Manual. Bombardier Inc. Jun. 1, 2005.*
P. J. Swatton. The Principles of Flight for Pilots. John Wiley & Sons Ltd. 2011. pp. 154-155.*
3M Polyurethane Protective Tape 8674, http://www.aircraftspruce.com/pages/cs/tape_polyurethane/3m8674tapeft.php.
Erosion and Impact Protection in Aircraft, http://solutions.3m.com/wps/portal/3M/en_EU/AerospaceSolutions/Home/Applications/RainAndSand/.
3M Polyurethane Protective Tape Application Instructions, Dec. 2008.
3M Polyurethane Protective Tape 8663, 8663 DL (dual liner) Technical Datasheet, Apr. 2010.
CSOBeech Leading Edge Tape Install, http://www.csobeech.com/leading-edge-tape.html.
DuPont Fluoropolymers, http://www2.dupont.com/chemicals/en-us/ch/fluoropolymers.html.
ACLAR Fluoropolymer Films, Specimen Preparation and Embedding Supplies, http://www.emsdiasum.com/microscopy/products/preparation/aclar_film.aspx.
Fluoropolymer Films, Types and Features of Fluoropolymer Films, http://www.daikin.com/chm/products/film/index.html.
Extended European Search Report, Application Ser. No. 14163491.5-1754 / 2799330, Nov. 14, 2014.
Office Action from Canadian Intellectual Property Office, Canadian Patent Application No. 2,846,709, Mar. 27, 2015.
State Intellectual Property Office of PRC Notification of First Office Action, dated Mar. 27, 2017, regarding Application No. 201410184102.3, 16 pages.

* cited by examiner

PROTECTIVE FINISH FOR WING TIP DEVICES

FIELD

The present disclosure relates to wing tip devices. In particular, it relates to a protective finish for wing tip devices.

BACKGROUND

Airfoil leading edges and nose cones of aircraft are susceptible to erosion caused by debris and/or weathering. As such, currently in industry, protective film or erosion caps are used to protect leading edges of airfoils and nose cones from erosion. For example, a known polyurethane protective tape has been used on airfoil leading edges to protect them from erosion. However, this is a flat tape and it does not have a contoured shape specific to the airfoil. At least one known aircraft includes winglets having a protective film covering on the leading edge of the winglet. Known erosion caps include contoured metal sheets mechanically fastened to the airfoil leading edge. These erosion caps extend rearwardly covering about ten (10) percent (%) of the chord length. As such, the mechanical fasteners and the back edge of the erosion cap disturbs the laminar flow. Such protective coverings and erosion caps are manufactured to only extended rearwardly covering about 10% of the chord length to save on weight and cost.

In addition, laminar flow across a winglet or other airfoil is also disturbed by steps that are formed from the layers of paint on the winglet (e.g., painting on the winglet is done by applying multiple single-color paint layers, and steps are formed between the successive layers of paint). The disruption of laminar flow by the back edge of the protective covering or erosion cap and/or by the paint steps increases the drag across the airfoil and reduces fuel efficiency.

Therefore, an improved protective finish for wing tip devices is needed.

SUMMARY

The present disclosure relates to a method, system, and apparatus for a protective finish for an airfoil. The disclosed method for a protective finish for an airfoil involves providing a sheath. The method further involves applying the sheath to the surface of the airfoil. In one or more embodiments, the sheath wraps around the surface of the airfoil from the leading edge of the airfoil towards the trailing edge of the airfoil. In at least one embodiment, the sheath covers approximately 50 percent to approximately 70 percent of the chord length of the airfoil.

In one or more embodiments, the sheath is manufactured from at least one polymer. In at least one embodiment, at least one polymer is a polyurethane and/or a floropolymer. In some embodiments, the sheath is manufactured from a polyurethane protective tape manufactured by the 3M™ Company.

In at least one embodiment, the airfoil is a winglet, a raked wing tip, and/or a wing. In one or more embodiments, the airfoil is manufactured to have a monocoque carbon fiber architecture.

In one or more embodiments, the method further involves printing an image on at least one side of the sheath. In at least one embodiment, the image is a customer livery, such as an airline trademark.

In at least one embodiment, the applying of the sheath to the surface of the airfoil is achieved by an adhesion of an adhesive surface of the sheath to the surface of the airfoil. In some embodiments, the sheath is manufactured to be contoured corresponding to a shape of the airfoil.

In one or more embodiments, a system for a protective finish for an airfoil comprises the airfoil, and a sheath. In at least one embodiment, the sheath is applied to the surface of the airfoil. In one or more embodiments, the sheath wraps around the surface of the airfoil from the leading edge of the airfoil towards the trailing edge of the airfoil. In some embodiments, the sheath covers approximately 50 percent to approximately 70 percent of the chord length of the airfoil.

In at least one embodiment, an image is printed on at least one side of the sheath. In some embodiments, the sheath is applied to the surface of the airfoil by adhesion of an adhesive surface of the sheath to the surface of the airfoil.

In one or more embodiments, an apparatus for use with an airfoil comprises a sheath, where the shape of the sheath is contoured corresponding to the shape of the airfoil. In at least one embodiment, the size of the sheath is such that the sheath, when wrapped around the surface of the airfoil from the leading edge of the airfoil towards the trailing edge of the airfoil, covers approximately 50 percent to approximately 70 percent of the chord length of the airfoil.

The features, functions, and advantages can be achieved independently in various embodiments of the present inventions or may be combined in yet other embodiments.

DRAWINGS

These and other features, aspects, and advantages of the present disclosure will become better understood with regard to the following description, appended claims, and accompanying drawings where:

DESCRIPTION

Figure 1:
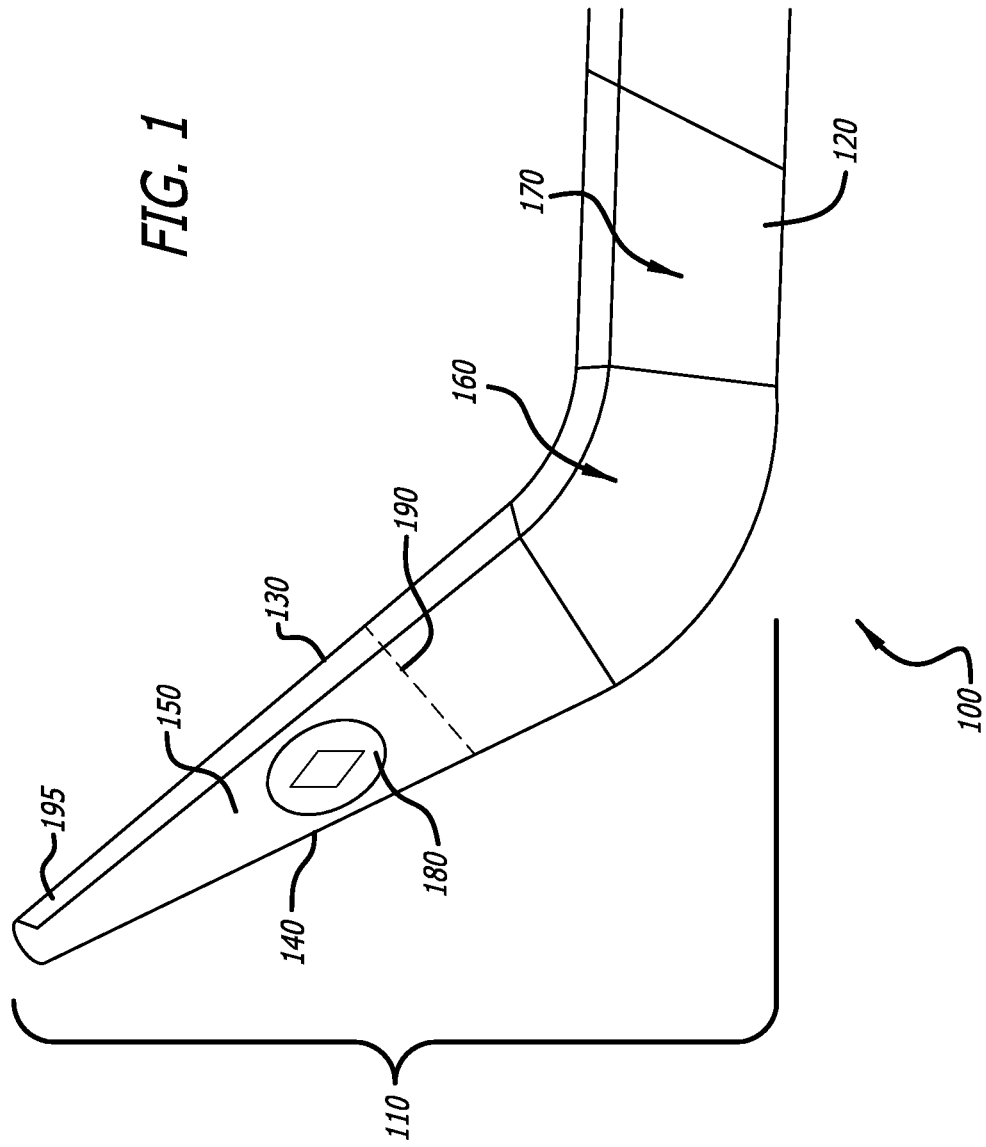
FIG. 1 is an illustration of an exemplary current, conventional design for airfoil protection.

The methods and apparatus disclosed herein provide an operative system for a protective finish for wing tip devices. Specifically, the system employs an airfoil sheath that wraps around the leading edge of an airfoil, and extends rearwardly from the leading edge towards the trailing edge to cover approximately fifty (50) to approximately seventy (70) percent (%) of the chord length of the airfoil. As such, the back edge of the sheath is positioned downstream from where the flow over the airfoil separates. In contrast, as previously mentioned above in the background section, current conventional leading edge protection extends only about ten (10) % of the chord length of the airfoil such that the back edge of the leading edge protection causes a disruption to the laminar flow across the airfoil.

The current existing design solutions for leading edge erosion protection and protection of customer livery (e.g., the airline trademark) of wing tip devices consists of a discrete metallic sheet attached to the leading edge of the wing tip device, where the customer livery is directly painted onto the torque box and trailing edge structure. This architecture results in a structural configuration that is higher in part count (i.e. it requires multiple detailed parts and mechanical fasteners), higher in assembly time (i.e. due to the high part count), and higher in the amount of tooling required to complete the assembly. The most significant drawback to these design solutions is the limitation of natural laminar flow across the wing tip device that occurs due to the joints in the assembled parts and the paint steps used for the customer livery.

The disclosed system provides a means to protect the leading edge of wing tip devices while increasing the natural laminar flow of the wing tip airfoil due to the elimination of a discrete attached erosion cap and corresponding streamwise join in the wing structure. The disclosed system will provide a protective finish system that will protect the leading edge of wing tip devices (e.g., winglets and/or raked wing tips), which in some embodiments are of a monocoque carbon fiber architecture. In addition, the disclosed system will eliminate the multiple paint steps (i.e. one paint step for each color) that are currently required as a result of a multi-colored unique livery, thereby providing a smooth surface to enable natural laminar flow across the planform livery.

In particular, the system of the present disclosure utilizes polyurethane tape(s) (i.e. a boot made of at least one thin sheet of polyurethane tape) for erosion protection and protection of customer livery on wingtip devices. The customer livery is digitally printed on an adhesive backed floropolymer film that covers the inboard and/or outboard planform surface of the wing tip device. The printed livery is wrapped by a polymer fitted boot that spans from the upper trailing edge to the lower trailing edge of the wing tip device. This protective finish system will protect the leading edge of, for example, a carbon monocoque airfoil from leading edge erosion as well as enable greater natural laminar flow due to the elimination of span-wise splices in the airfoil.

As previously mentioned, the disclosed system provides a protective coating that increase laminar flow across an airfoil, such as a winglet, and provides erosion protection for the leading edge. More specifically, the proposed airfoil sheath includes a contoured film corresponding to the shape of the leading edges of a multi-surfaced winglet. The film has a smooth finish to facilitate laminar flow over the leading edges. Further, the sheath extends rearwardly from the leading edge toward the trailing edge to cover approximately 50 to approximately 70% (in some embodiments, to cover approximately ⅔ is preferable) of the chord length of the winglet airfoil. Although the sheath includes more material (i.e. thereby leading to added weight and cost) as compared to known film coverings and erosion caps, the back edge of the proposed sheath is positioned downstream from the point where the flow over the winglet separates. As such, the sheath does not disturb the laminar flow over the winglet. Additionally, the proposed sheath covers the paint on the airfoil to shield the paint from contact with the flow over the winglet. As such, the steps in the winglet livery paint do not impact the flow over the winglet. The sheath can be formed from polyurethane, floropolymer, or other suitable polymer.

In the following description, numerous details are set forth in order to provide a more thorough description of the system. It will be apparent, however, to one skilled in the art, that the disclosed system may be practiced without these specific details. In the other instances, well known features have not been described in detail so as not to unnecessarily obscure the system.

FIG. 1 is an illustration of an exemplary current, conventional design 100 for airfoil protection. In this figure, a winglet 110 on a main wing 120 of an aircraft (not shown) is depicted. The winglet 110 may be manufactured from various different materials including, but not limited to, carbon fiber and/or aluminum (Al). The winglet 110 has a leading edge 130 and a trailing edge 140. In addition, the winglet 110 is shown to have three segments: a first segment 150, a second segment 160, and a third segment 170. Also, the customer livery 180 (e.g., the airline trademark) is printed directly onto the surface of the winglet 110.

As is shown in this figure, the leading edge 130 of the winglet 110 is covered with a thin strip of metal 195 that is riveted to the winglet 110. This thin strip of metal 195 is used for protection for the winglet 110 from erosion caused by debris and/or weathering. For this design, the strip of metal 195 only covers approximately ten percent of the chord length 190 of the winglet 110 and, as such, causes a disruption to the laminar flow across the winglet 110.

Also, it should be noted that since the customer livery 180 is printed directly onto the surface of the winglet 110, the multiple layers of paint, which are needed to paint the different colors of the customer livery 180 (e.g., one layer of paint is needed for each color), also cause a disruption to the laminar flow across the winglet 110. In addition, it should be noted that since the rivets, which are used to attach the thin strip of metal 195 to the winglet 110, are not completely flush with the surface of the winglet 110, the rivets also contribute to the disruption of the laminar flow across the winglet 110.

Figure 2:
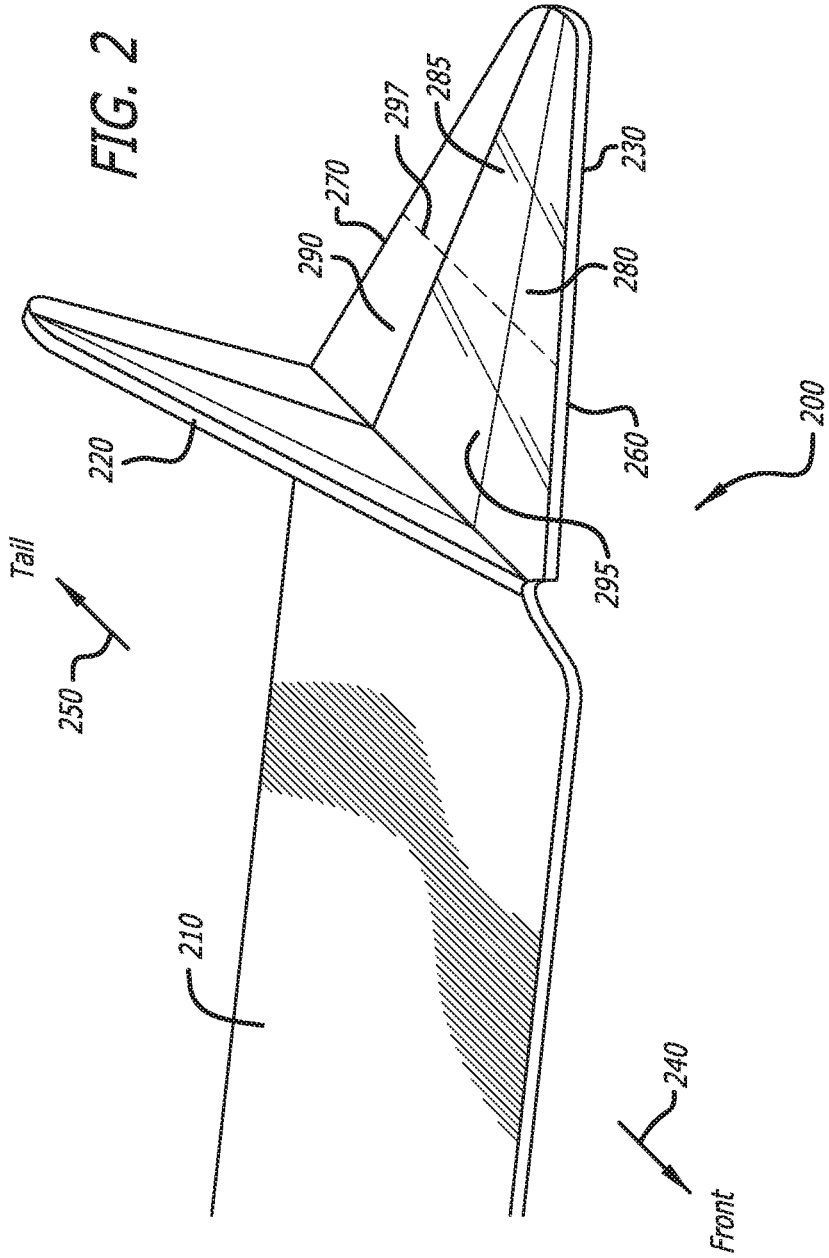
FIG. 2 is an illustration of the disclosed system for a protective finish for an airfoil, in accordance with at least one embodiment of the present disclosure.

FIG. 2 is an illustration of the disclosed system 200 for a protective finish for an airfoil, in accordance with at least one embodiment of the present disclosure. In this figure, a main wing 210 of an aircraft (not shown) is shown to have two winglets, an upper winglet 220 and a lower winglet 230. In order to understand the orientation of the aircraft (not shown) in this figure, arrow 240 is pointing towards the location of the nose of the aircraft, and arrow 250 is pointing towards the location of the tail of the aircraft.

For this figure, the disclosed system 200 is illustrated to be employed by the lower winglet 230. However, it should be noted that in various embodiments, both winglets 220, 230 or only one winglet 220, 230 (especially for the case of a main wing that only employs one winglet) may employ this disclosed system 200.

The lower winglet 230, which employs the disclosed system 200, is shown to have a leading edge 260 and a trailing edge 270. The lower winglet 230 also has a front spar 280, a mid spar 285, and a rear spar 290. For the disclosed system 200, a sheath 295 is applied to the surface of the lower winglet 230. The sheath 295 is applied such that the sheath 295 wraps around the surface of the lower winglet 230 from the leading edge 260 of the lower winglet 230 towards the trailing edge 270 of the lower winglet 230, and such that the sheath 295 covers approximately 50 to approximately 70 percent of the chord length 297 of the lower winglet 230. Preferably the sheath 295 covers approximately two-thirds (⅔) of the chord length 297 of the lower winglet 230.

The sheath 295 may be manufactured from at least one polymer, such as a polyurethane and/or a floropolymer. In some embodiments, a polyurethane protective tape (e.g., at least one large sheet of tape) manufactured by the 3M™ company is employed for the sheath 295. In addition, the sheath 295 is manufactured such that it is contoured corresponding to the shape of the lower winglet 230.

In one or more embodiments, one side of the sheath 295 is manufactured to have an adhesive. For these embodiments, the adhesive side of the sheath 295 is placed in contact with the surface of the lower winglet 230 such that the sheath 295 adheres to the surface of lower winglet 230.

In some embodiments, the sheath 295 is significantly transparent. For these embodiments, the customer livery may be printed on the side of the sheath 295 that is in contact with the surface of the lower winglet 230 such that the customer livery shows through on the opposite side of the sheath 295. Since the customer livery is printed on the underside of the sheath 295 and not the external side of the sheath 295, the layers of paint of the customer livery are covered by the sheath 295 and, thus, the paint layers will not cause a disruption to the laminar flow across the lower winglet 230.

It should be noted that in other embodiments, the customer livery may be painted directly onto the surface of the lower winglet 230, and then the sheath 295 may be placed on top of the surface of the lower winglet 230, thereby allowing the paint of the customer livery to show through the significantly transparent sheath 295. Since the customer livery is printed on the lower winglet 230, which is covered by the sheath 295, the layers of paint of the customer livery are covered by the sheath 295 and, thus, the paint layers will not cause a disruption to the laminar flow across the lower winglet 230.

Figure 3:
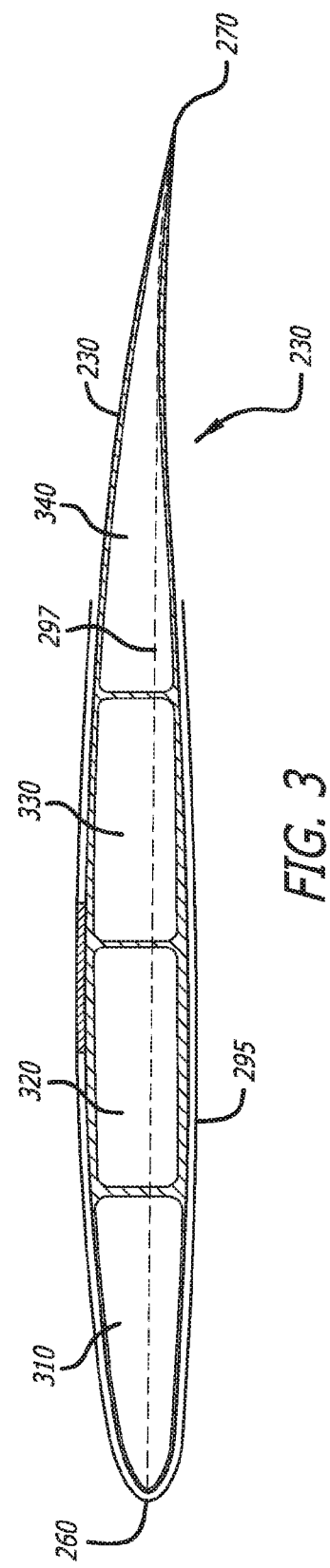
FIG. 3 is a cross-sectional view of the lower winglet of FIG. 2, in accordance with at least one embodiment of the present disclosure.

FIG. 3 is a cross-sectional view of the lower winglet 230 of FIG. 2, in accordance with at least one embodiment of the present disclosure. In this figure, the lower winglet 230 is shown to have a leading edge 260 and a trailing edge 270. The chord 297 of the lower winglet 230 stretches from the leading edge 260 to the trailing edge 270. In addition, the lower winglet is shown to contain four cells: a first cell 310, a second cell 320, a third cell 330, and a fourth cell 340.

In this figure, the sheath 295 is shown to be applied to the surface of the lower winglet 230 such that the sheath 295 wraps around the surface of the lower winglet 230 from the leading edge 260 of the lower winglet 230 towards the trailing edge 270 of the lower winglet 230, and such that the sheath 295 covers approximately 50 to approximately 70 percent of the chord length 297 of the lower winglet 230.

Although certain illustrative embodiments and methods have been disclosed herein, it can be apparent from the foregoing disclosure to those skilled in the art that variations and modifications of such embodiments and methods can be made without departing from the true spirit and scope of the art disclosed. Many other examples of the art disclosed exist, each differing from others in matters of detail only. Accordingly, it is intended that the art disclosed shall be limited only to the extent required by the appended claims and the rules and principles of applicable law.

We claim:

1. A method for reducing disruptions to laminar airflow on an airfoil, the method comprising:
preventing airflow from contacting steps of paint layers on the airfoil via applying a sheath to a surface of the airfoil by wrapping the sheath around the surface of the airfoil from a leading edge of the airfoil towards a trailing edge of the airfoil, the sheath at least one of: covering, and eliminating the steps; and
eliminating disruptions to laminar airflow generating from an edge of an erosion cap on a leading edge of the airfoil via replacing the erosion cap via the sheath covering approximately 50 percent to approximately 70 percent of a chord length of the airfoil.

2. The method of claim 1, wherein the method further comprises:
eliminating airflow contacting an apparatus securing the erosion cap to the airfoil; and
manufacturing the sheath from at least one polymer.

3. The method of claim 1, wherein the method further comprises:
the sheath extending aft from the leading edge at least to a last point, along the chord length, designed for natural laminar flow on the airfoil; and
manufacturing the sheath from a polyurethane protective tape.

4. The method of claim 1, wherein the method further comprises manufacturing the airfoil to have a monocoque carbon fiber architecture.

5. The method of claim 1, wherein the method further comprises printing an image on a first side of the sheath, which is significantly transparent, wherein the image is located between the first side of the sheath and the surface of the airfoil such that the image shows through a second side of the sheath.

6. The method of claim 1, wherein the applying of the sheath to the surface of the airfoil is achieved by an adhesion of an adhesive surface of the sheath to the surface of the airfoil.

7. The method of claim 1, wherein the method further comprises manufacturing the sheath to be contoured corresponding to a shape of the airfoil.

8. A method for expanding an erosion control area and reducing disruptions to laminar airflow on an airfoil, the comprising:
replacing an existing erosion cap apparatus, extending aft approximately 10% of a wing chord line, via applying a sheath comprising a shape contoured corresponding to a shape of the airfoil, to the airfoil via wrapping the sheath around the surface of the airfoil from a leading edge of the airfoil towards a trailing edge of the airfoil and covering approximately 50 percent to approximately 70 percent of a chord length of the airfoil, and positioning an edge of the sheath, nearest the trailing edge of the airfoil, aft from the leading edge at least to a last point, along the chord length, designed for natural laminar flow on the airfoil.

9. The method of claim 8, further comprising eliminating a disruption to laminar airflow caused by a paint step on the airfoil, via covering the paint step with the sheath, and wherein the sheath is manufactured from at least one polymer.

10. The method of claim 9, further comprising eliminating a disruption to laminar airflow caused by a paint step on the airfoil, via removing the paint step and painting an image on a side of the sheath contacting the airfoil, and wherein the at least one polymer is at least one of a polyurethane and a floropolymer.

11. The method of claim 8, wherein the sheath is manufactured from a polyurethane protective tape.

* * * * *